US012534555B2

(12) United States Patent
Kim et al.

(10) Patent No.: US 12,534,555 B2
(45) Date of Patent: Jan. 27, 2026

(54) THERMOPLASTIC RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Insoo Kim, Daejeon (KR); Hyung Sub Lee, Daejeon (KR); Dae Woo Lee, Daejeon (KR); Jung Tae Park, Daejeon (KR); Suk Jo Choi, Daejeon (KR); Mincheol Ju, Daejeon (KR); Minseung Shin, Daejeon (KR); Sungwon Hong, Daejeon (KR); Hyun Jun Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 792 days.

(21) Appl. No.: 17/782,883

(22) PCT Filed: Jun. 11, 2021

(86) PCT No.: PCT/KR2021/007345

§ 371 (c)(1),
(2) Date: Jun. 6, 2022

(87) PCT Pub. No.: WO2022/097867

PCT Pub. Date: May 12, 2022

(65) Prior Publication Data

US 2023/0109397 A1 Apr. 6, 2023

(30) Foreign Application Priority Data

Nov. 5, 2020 (KR) ........................ 10-2020-0146750
Jun. 9, 2021 (KR) ........................ 10-2021-0074833

(51) Int. Cl.

| | |
|---|---|
| ***C08F 212/10*** | (2006.01) |
| ***C08F 2/18*** | (2006.01) |
| ***C08F 220/14*** | (2006.01) |
| ***C08F 279/04*** | (2006.01) |
| ***C08L 33/12*** | (2006.01) |

(52) U.S. Cl.

CPC .............. *C08F 212/10* (2013.01); *C08F 2/18* (2013.01); *C08F 220/14* (2013.01); *C08F 279/04* (2013.01); *C08L 33/12* (2013.01); *C08L 2205/025* (2013.01); *C08L 2205/03* (2013.01)

(58) Field of Classification Search

CPC .......... C08L 33/10; C08L 33/12; C08L 33/08; C08L 2205/025; C08L 2205/03; C08L 51/003; C08L 51/04; C08F 220/14; C08F 220/18; C08F 220/1802; C08F 220/1803; C08F 220/1804; C08F 220/1805; C08F 220/1806; C08F 220/1807; C08F 220/1808; C08F 220/1809; C08F 220/1811; C08F 220/1812; C08F 220/1818; C08F 212/00; C08F 212/02; C08F 212/08; C08F 222/40

See application file for complete search history.

(56) References Cited

U.S. PATENT DOCUMENTS

| | | |
|---|---|---|
| 4,916,196 A | 4/1990 | Aoki et al. |
| 2012/0322945 A1 | 12/2012 | Tomita et al. |
| 2013/0345362 A1 | 12/2013 | Maeda et al. |
| 2017/0137620 A1 | 5/2017 | Iwanaga et al. |
| 2018/0312693 A1 | 11/2018 | Iwanaga et al. |
| 2019/0218322 A1 | 7/2019 | Park et al. |
| 2020/0040115 A1 | 2/2020 | Seo et al. |
| 2021/0061984 A1 | 3/2021 | Shin et al. |
| 2021/0206958 A1 | 7/2021 | Park et al. |
| 2021/0230333 A1 | 7/2021 | Jo et al. |

FOREIGN PATENT DOCUMENTS

| | | |
|---|---|---|
| CN | 109790351 A | 5/2019 |
| JP | S61171708 A | 8/1986 |
| JP | S62199645 A | 9/1987 |
| JP | 01-087651 B2 | 3/1989 |
| JP | H0662694 A | 3/1994 |
| JP | 2001-026619 A | 1/2001 |

(Continued)

OTHER PUBLICATIONS

JPS62199645A machine translation (Year: 2025).*

Second Office Action dated Sep. 13, 2023 from the CNIPA corresponding Chinese Patent Application No. 202180007202.7. Note: JPS 1987(62)-199645 A and JP 2001-026619 A cited therein are already of record.

(Continued)

*Primary Examiner* — Jeffrey S Lenihan

(74) *Attorney, Agent, or Firm* — Morgan, Lewis & Bockius LLP

(57) ABSTRACT

The present disclosure relates to a thermoplastic resin composition including a styrene-based copolymer comprising a (meth)acrylate-based monomer, an aromatic vinyl-based monomer, and a maleimide-based monomer; a first graft copolymer including an acrylic-based rubber polymer, an aromatic vinyl-based monomer, and a vinyl cyanide-based monomer; and a second graft copolymer comprising an acrylic-based rubber polymer, an aromatic vinyl-based monomer, and a vinyl cyanide-based monomer, wherein the styrene-based copolymer has a residual oligomer content of 0.37% by weight or less, and the acrylic-based rubber polymer of the first graft copolymer and the acrylic-based rubber polymer of the second graft copolymer have different average particle diameters. A method of preparing the thermoplastic resin composition, and a molded article including the thermoplastic resin composition are also disclosed.

5 Claims, No Drawings

(56) References Cited

FOREIGN PATENT DOCUMENTS

| | | | |
|---|---|---|---|
| JP | 2012-214734 | A | 11/2012 |
| JP | 2017-039951 | A | 2/2017 |
| JP | 2018-203837 | A | 12/2018 |
| JP | 2019-059906 | A | 4/2019 |
| KR | 10-1995-0006130 | B1 | 6/1995 |
| KR | 10-0361161 | B1 | 4/2003 |
| KR | 10-2006-0115271 | A | 11/2006 |
| KR | 10-2008-0097867 | A | 11/2008 |
| KR | 10-2018-0133363 | A | 12/2018 |
| KR | 10-2019-0013569 | A | 2/2019 |
| KR | 10-2019-0082087 | A | 7/2019 |
| KR | 10-2035035 | B1 | 10/2019 |
| KR | 10-2035036 | B1 | 10/2019 |
| KR | 10-2020-0049623 | A | 5/2020 |
| KR | 10-2020-0089101 | A | 7/2020 |
| WO | WO2019022544 | A1 * | 1/2019 |
| WO | 2020/130400 | A1 | 6/2020 |

OTHER PUBLICATIONS

Polymer chemistry, pp. 147, PAN Caiyuan 4.4 Suspension Polymerization, 1997.

International Search Report and Written Opinion issued in corresponding International Patent Application No. PCT/KR2021/007345, dated Sep. 28, 2021.

First Office Action issued in corresponding CN Patent Application No. 202180007202.7, dated Mar. 10, 2023. (KR 10-2020-0089101 A.).

First Office Action issued in corresponding JP Patent Application No. 2022-537182, dated Jun. 12, 2023. (KR 10-2020-0089101 and KR 10-2035035.).

Extended European Search Report issued in corresponding EP Patent Application No. 21889335.2, dated Jun. 26, 2023.

* cited by examiner

THERMOPLASTIC RESIN COMPOSITION, METHOD OF PREPARING THE SAME, AND MOLDED ARTICLE MANUFACTURED USING THE SAME

CROSS-REFERENCE TO RELATED APPLICATIONS

This application claims priority to Korean Patent Application No. 10-2020-0146750, filed on Nov. 5, 2020, and Korean Patent Application No. 10-2021-0074833, re-filed on Jun. 9, 2021, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article manufactured using the same, and more particularly, to a thermoplastic resin composition having excellent weather resistance and heat resistance and greatly improved processability and scratch resistance while minimizing deterioration in colorability and heat resistance; a method of preparing the thermoplastic resin composition; and a molded article manufactured using the thermoplastic resin composition.

BACKGROUND ART

Acrylonitrile-butadiene-styrene (hereinafter referred to as “ABS-based”) resins are widely used in various fields, such as automobile products, electrical/electronic products, and office equipment due to excellent rigidity, chemical resistance, processability, and mechanical strength thereof and an aesthetically pleasing appearance thereof. However, since ABS-based resins are prepared using a butadiene rubber polymer, there is a limitation that ABS-based resins are not suitable as outdoor materials due to weak weather resistance thereof.

To solve this problem and obtain a thermoplastic resin having excellent physical properties, weather resistance, and aging resistance, acrylonitrile-styrene-acrylate (hereinafter referred to as “ASA-based”) resins have been developed using a crosslinked alkyl (meth)acrylate rubber polymer not containing ethylenically unsaturated polymers that promote aging caused due to ultraviolet rays in a graft copolymer. ASA-based resins have excellent weather resistance and aging resistance, and thus are used in various fields, such as automobiles, ships, leisure goods, building materials, and gardening goods.

Technology for providing a heat-resistant ASA-based resin using an alkyl-substituted styrene-based monomer has been developed. However, since the alkyl-substituted styrene-based monomer is included, glass transition temperature is increased. Accordingly, weather resistance, heat resistance, and scratch resistance are improved, but refractive index is significantly increased, resulting in deterioration in colorability. Thus, there is a limitation in implementing blackness (Color L).

In addition, in this technology using the alkyl-substituted styrene-based monomer, bulk polymerization is used. In this case, product yield is reduced due to high viscosity, and generation of residual oligomers is increased due to decomposition of a copolymer, thereby degrading heat resistance.

Therefore, research on a thermoplastic resin composition having improved colorability, processability, and scratch resistance and a low residual oligomer content while maintaining weather resistance and heat resistance and a method of preparing the thermoplastic resin composition is in progress.

RELATED ART DOCUMENTS

Patent Documents

KR 2035036 B1

DISCLOSURE

Technical Problem

Therefore, the present invention has been made in view of the above problems, and it is one object of the present invention to provide a thermoplastic resin composition having excellent colorability, processability, and scratch resistance and having a low residual oligomer content while having excellent weather resistance and heat resistance.

It is another object of the present invention to provide a method of preparing the thermoplastic resin composition.

It is yet another object of the present invention to provide a molded article manufactured using the thermoplastic resin composition.

The above and other objects can be accomplished by the present invention described below.

Technical Solution

In accordance with one aspect of the present invention, provided is a thermoplastic resin composition comprising:

a styrene-based copolymer comprising a (meth)acrylate-based monomer, an aromatic vinyl-based monomer, and a maleimide-based monomer;

a first graft copolymer comprising an acrylic-based rubber polymer, an aromatic vinyl-based monomer, and a vinyl cyanide-based monomer; and a second graft copolymer comprising an acrylic-based rubber polymer, an aromatic vinyl-based monomer, and a vinyl cyanide-based monomer, wherein the styrene-based copolymer has a residual oligomer content of 0.37% by weight or less, and the acrylic-based rubber polymer of the first graft copolymer and the acrylic-based rubber polymer of the second graft copolymer have different average particle diameters.

In accordance with another aspect of the present invention, provided is a method of preparing a thermoplastic resin composition, the method comprising:

suspension-polymerizing a polymerization solution prepared by mixing 100 parts by weight of a monomer mixture comprising a (meth)acrylate-based monomer, an aromatic vinyl-based monomer, and a maleimide-based monomer, 100 to 200 parts by weight of a reaction solvent, 0.01 to 1 part by weight of an initiator, 1 to 5 parts by weight of a dispersant, and 0.01 to 1 part by weight of a molecular weight regulator;

adjusting a pH of a polymerization slurry formed by the suspension polymerization to 1 to 4 and preparing a styrene-based copolymer in a bead form; and mixing 65 to 85% by weight of the styrene-based copolymer, 10 to 30% by weight of a first graft copolymer comprising an acrylic-based rubber polymer, and 1 to 15% by weight of a second graft copolymer comprising an acrylic-based rubber polymer and performing kneading and extrusion at 200 to 270° C., wherein the styrene-based copolymer has a residual oligomer content of 0.37% by weight or less, and the acrylic-based rubber polymer of the first graft copolymer and the acrylic-based rubber polymer of the second graft copolymer have different average particle diameters.

In accordance with yet another aspect of the present invention, provided is a molded article manufactured using the above-described thermoplastic resin composition.

Advantageous Effects

According to the present invention, there is an effect of providing a thermoplastic resin composition having excellent colorability, processability, and scratch resistance and having a low residual oligomer content while having excellent weather resistance and heat resistance, a method of preparing the thermoplastic resin composition, and a molded article including the thermoplastic resin composition.

Therefore, the thermoplastic resin composition and the molded article according to the present invention may be applied to various industrial fields.

BEST MODE

Hereinafter, the present invention will be described in more detail to aid in understanding of the present invention.

The terms and words which are used in the present specification and the appended claims should not be construed as being confined to common meanings or dictionary meanings but should be construed as having meanings and concepts matching the technical spirit of the present invention in order to describe the present invention in the best fashion.

In this description, a polymer comprising a certain compound means a polymer prepared by polymerizing including the compound, a polymer polymerized by using the compound, and a polymer including a unit in the polymer is derived from the compound.

In this description, heat resistance may be measured by various methods known in the art, and unless otherwise specified, heat resistance refers to a glass transition temperature (Tg) measured using a differential scanning calorimeter (manufacturer: Ta Instruments, product name: DISCOVERY DSC25).

When a copolymer has a glass transition temperature (Tg) of 116° C. or higher, the copolymer may be classified as a heat-resistant copolymer.

In addition, in this description, average particle diameter may be measured by dynamic light scattering. Specifically, the average particle diameter of a specimen in a latex form may be measured in a Gaussian mode using a particle size distribution analyzer (Nicomp 380). In a particle size distribution measured by dynamic light scattering, an arithmetic average particle diameter may mean a scattering intensity average particle diameter.

As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 μsec.

In this description, weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specifically, the weight average molecular weight is a weight average molecular weight (Mw) converted based on polystyrene by gel permeation chromatography (GPC, PL GPC220, Agilent Technologies).

Specifically, a polymer to be measured is dissolved in tetrahydrofuran to a concentration of 1%, and 10 μl of the dissolved sample is injected into a gel permeation chromatograph (GPC) at a flow rate of 0.3 mL/min. At this time, analysis is performed at a sample concentration of 2.0 mg/mL (100 μl injection) at 30° C. In this case, two columns (PLmixed B, Waters Co.) are connected, and an RI detector (2414, Agilent Waters Co.) is used. At this time, measurement is performed at 40° C., and data is processed using ChemStation.

In this description, the composition ratio of a (co)polymer may mean the content of units constituting the (co)polymer, or may mean the content of units input during polymerization of the (co)polymer.

In this description, unless otherwise defined, "content" means weight.

The present inventors confirmed that, when two types of graft copolymers each including rubber having different average particle diameters and a styrene-based copolymer including a (meth)acrylate-based monomer, an aromatic vinyl-based monomer, and a maleimide-based monomer, formed by polymerizing a (meth)acrylate monomer mixture, and having a residual oligomer content below a specific value were mixed within a predetermined content range, all of heat resistance, weather resistance, colorability, processability, and scratch resistance were improved. Based on these results, the present inventors conducted further studies to complete the present invention.

A thermoplastic resin composition according to one embodiment of the present invention includes a styrene-based copolymer comprising a (meth)acrylate-based monomer, an aromatic vinyl-based monomer, and a maleimide-based monomer; a first graft copolymer comprising an acrylic-based rubber polymer, an aromatic vinyl-based monomer, and a vinyl cyanide-based monomer; and a second graft copolymer comprising an acrylic-based rubber polymer, an aromatic vinyl-based monomer, and a vinyl cyanide-based monomer. In this case, the styrene-based copolymer has a residual oligomer content of 0.37% by weight or less, and the acrylic-based rubber polymer of the first graft copolymer and the acrylic-based rubber polymer of the second graft copolymer have different average particle diameters. In this case, colorability, processability, and scratch resistance may be improved while maintaining weather resistance and heat resistance.

Hereinafter, each component of the thermoplastic resin composition of the present invention will be described in detail.

<Thermoplastic Resin Composition>

Styrene-Based Copolymer

The styrene-based copolymer may be a heat-resistant copolymer prepared by polymerizing a monomer mixture including a (meth)acrylate-based monomer, an aromatic vinyl-based monomer, and a maleimide-based monomer.

In this case, each monomer becomes a unit of the heat-resistant copolymer.

The styrene-based copolymer may improve the colorability, heat resistance, and scratch resistance of a thermoplastic resin composition. In addition, when the styrene-based copolymer includes a (meth)acrylate-based monomer, the weather resistance of a thermoplastic resin composition may be improved.

The monomer mixture, i.e., styrene copolymer, may include 62 to 88% by weight of the (meth)acrylate-based monomer, 5 to 26% by weight of the aromatic vinyl monomer, and 1 to 10% by weight of the maleimide-based monomer. Preferably, the monomer mixture includes 64 to 86% by weight of the (meth)acrylate-based monomer, 10 to 26% by weight of the aromatic vinyl monomer, and 2 to 10% by weight of the maleimide-based monomer. Within this range, a styrene-based copolymer having a low refractive index and a high glass transition temperature may be prepared.

In addition, when the styrene-based copolymer is applied to a thermoplastic resin composition, in addition to colorability and heat resistance, the scratch resistance and weather resistance of the thermoplastic resin composition may be improved.

In this case, when a small amount of the (meth)acrylate-based monomer is included, a styrene-based copolymer having a high refractive index is prepared. When such a styrene-based copolymer is applied to a thermoplastic resin composition, the colorability of the thermoplastic resin composition may be reduced. On the other hand, when an excess of the (meth)acrylate-based monomer is included, the aromatic vinyl-based monomer and the maleimide-based monomer are included in relatively small amounts. Accordingly, a styrene-based copolymer having a low glass transition temperature may be prepared. When such a styrene-based copolymer is applied to a thermoplastic resin composition, the heat resistance and scratch resistance of the thermoplastic resin composition may be deteriorated.

In addition, when a small amount of the maleimide-based monomer is included, a styrene-based copolymer having a low glass transition temperature is prepared. When such a styrene-based copolymer is applied to a thermoplastic resin composition, the heat resistance of the thermoplastic resin composition may be deteriorated. When an excess of the maleimide-based monomer is included, the (meth)acrylate-based monomer and the aromatic vinyl-based monomer are included in relatively small amounts. Thus, a styrene-based copolymer having a high refractive index may be prepared. When such a styrene-based copolymer is applied to a thermoplastic resin composition, the colorability and scratch resistance of the thermoplastic resin composition may be deteriorated.

For example, the (meth)acrylate-based monomer included in the styrene-based copolymer may include one or more selected from the group consisting of (meth)acrylate, methyl (meth)acrylate, ethyl (meth)acrylate, and propyl (meth)acrylate, preferably methyl (meth)acrylate. In this case, (meth) acrylate may include both of acrylate and methacrylate.

For example, the aromatic vinyl monomer included as a unit in the styrene-based copolymer may include one or more selected from the group consisting of styrene, α-methyl styrene, α-ethyl styrene, and ρ-methyl styrene, preferably styrene.

In addition, when the styrene-based copolymer is prepared using an alkyl styrene-based monomer, polymerization rate is slow, a long reaction time is required, the resulting copolymer has a low weight average molecular weight, and the resulting copolymer may be easily thermally decomposed. In addition, a copolymer having a high glass transition temperature may be prepared, but the copolymer has a remarkably high refractive index. Accordingly, in the present invention, the alkyl styrene-based monomer is preferably not included.

For example, N-phenylmaleimide is preferably used as the maleimide-based monomer included in the styrene-based copolymer. When N-phenylmaleimide is used, compared to isopropyl maleimide, transparency, colorability, heat resistance, and reactivity may be improved.

The styrene-based copolymer may include the aromatic vinyl-based monomer and the (meth)acrylate-based monomer in a weight ratio of 1:2.25 to 1:3.5 or 1:4.8 to 1:10, preferably a weight ratio of 1:2.46 to 1:3.5 or 1:4.8 to 1:8.6. Within this range, a styrene-based copolymer having a high glass transition temperature may be prepared. When such a styrene-based copolymer is applied to a thermoplastic resin composition, the heat resistance of the thermoplastic resin composition may be further improved.

For example, the styrene-based copolymer may be a low refractive index heat-resistant copolymer having a refractive index of 1.518 or less, preferably 1.499 to 1.517, more preferably 1.499 to 1.515.

In this description, refractive index may be measured at 25° C. using an Abbe refractometer according to a known method, e.g., ASTM D542.

In addition, the refractive index of the styrene-based copolymer may be measured using the refractive indexes and contents of each component (or polymer) constituting the styrene-based copolymer according to Equation 1 below:

$$RI=\Sigma(Wti \times RIi) \quad \text{[Equation 1]}$$

In Equation 1, Wti represent the weight fraction (%) of each component (or polymer) of the styrene-based copolymer, and RIi represents the refractive index of a styrene-based copolymer-forming polymer.

As the glass transition temperature of the styrene-based copolymer is improved, a thermoplastic resin composition having excellent scratch resistance may be provided.

For example, the styrene-based copolymer may have a glass transition temperature of 120° C. or higher, preferably 120 to 130° C., more preferably 120.1 to 124.3° C.

In this description, glass transition temperature may be measured using a differential scanning calorimeter (product name: DSC Q20, manufacturer: Ta Instruments).

The styrene-based copolymer may have a weight average molecular weight of 90,000 to 139,000 g/mol, preferably 96,000 to 133,000 g/mol.

In this description, weight average molecular weight is measured at 40° C. using tetrahydrofuran (THF) as an eluate using a gel permeation chromatograph (GPC) filled with porous silica as a column packing material. In this case, weight average molecular weight is obtained as a relative value to a polystyrene standard (PS) specimen.

The styrene-based copolymer may have a residual oligomer content of 0.37% by weight or less, preferably 0.32 to 0.36% by weight.

In this description, residual oligomer content may be measured using a method commonly practiced in the art. For example, 1 g of a sample is dissolved in 10 mL of chloroform, and polymers are precipitated using methanol to obtain the supernatant of the sample. Then, the supernatant is filtered using a 0.2 μm disc syringe filter, and residual oligomer content is measured using ALS-GC/FID.

As the residual oligomer content of a styrene-based copolymer decreases, a high-purity copolymer may be prepared.

In the present invention, when the styrene-based copolymer satisfies refractive index, glass transition temperature, weight average molecular weight, and residual oligomer content described above, a balance between colorability and heat resistance may be achieved. When such a copolymer is applied to a thermoplastic resin composition, the thermoplastic resin composition may have excellent colorability and heat deflection temperature.

In addition, as heat deflection temperature is improved, a thermoplastic resin composition having excellent scratch resistance may be prepared.

The styrene-based copolymer is preferably a methylmethacrylate-styrene-N-phenylmaleimide copolymer.

The styrene-based copolymer may be prepared by suspension-polymerizing the above described monomer mixture as described below. For reference, when the styrene-based copolymer is prepared by solution polymerization, the styrene-based copolymer may have a low product yield due to high viscosity, and the heat resistance of the styrene-based copolymer may be deteriorated due to low residual oligomer content.

For example, based on a total weight of the thermoplastic resin composition, the styrene-based copolymer may be included in an amount of 65 to 85% by weight, preferably 70 to 80% by weight, more preferably 72 to 77% by weight. Within this range, weather resistance, colorability, processability, and scratch resistance may be improved while maintaining heat resistance.

First Graft Copolymer

The first graft copolymer may be prepared by graft-polymerizing acrylic-based rubber, an aromatic vinyl monomer, and a vinyl cyanide-based monomer. For example, the first graft copolymer may be a graft copolymer including an acrylic-based rubber polymer having an average particle diameter of 50 to 200 nm. In this case, in addition to mechanical properties such impact strength and tensile strength, heat resistance, colorability, and weather resistance may be excellent.

For example, the acrylic-based rubber included in the first graft copolymer may have an average particle diameter of 50 to 200 nm, preferably 70 to 150 nm, more preferably 100 to 130 nm. Within this range, mechanical properties, heat resistance, and weather resistance may be excellent. When the average particle diameter is less than the above range, mechanical properties, such impact strength and tensile strength, may be deteriorated. When the average particle diameter exceeds the above range, thermal stability may be reduced.

For example, based on a total weight of the first graft copolymer, the acrylic-based rubber included in the first graft copolymer may be included in an amount of 20 to 60% by weight, preferably 30 to 55% by weight, more preferably 40 to 50% by weight. Within this range, weather resistance, impact strength, and scratch resistance may be excellent.

In this description, average particle diameter may be measured by dynamic light scattering, and specifically, may be measured as an intensity value using a Nicomp 380 particle size analyzer in a Gaussian mode.

For example, the acrylic-based rubber may be prepared by emersion-polymerizing the (meth)acrylate-based monomer. As a specific example, the acrylic-based rubber may be prepared by mixing the (meth)acrylate-based monomer, an emulsifier, an initiator, a grafting agent, a crosslinking agent, an electrolyte, and water and emulsion-polymerizing the mixture. In this case, grafting degree may be improved, and thus physical properties such as impact resistance may be excellent.

For example, the (meth)acrylate-based monomer may include one or more selected from the group consisting of alkyl (meth)acrylates having 2 to 8 carbon atoms, an alkyl acrylate containing an alkyl group having 4 to 8 carbon atoms, more preferably butyl acrylate or ethylhexyl acrylate.

The emulsion polymerization may be graft emulsion polymerization. For example, the emulsion polymerization may be performed at 50 to 85° C., preferably 60 to 80° C.

The emulsion polymerization may be performed in the presence of an initiator and an emulsifier.

The initiator is preferably a radical initiator. As a specific example, the initiator may include one or more selected from inorganic peroxides including sodium persulfate, potassium persulfate, ammonium persulfate, potassium superphosphate, and hydrogen peroxide; organic peroxides including t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutyrate; and azo compounds including azobis isobutyronitrile, azobis-2,4-dimethylvaleronitrile, azobis(cyclohexanecarbonylnitrile), and azobis isobutyric acid methyl.

In addition to the initiator, an activator may be further added to promote initiation reaction.

For example, the activator may include one or more selected from sodium formaldehyde sulfoxylate, sodium ethylenediamine tetraacetate, ferrous sulfate, dextrose, sodium pyrophosphate, anhydrous sodium pyrophosphate, and sodium sulfate.

For example, based on 100 parts by weight in total of rubber and monomers constituting the first graft copolymer, the initiator may be included in an amount of 0.001 to 1 part by weight, preferably 0.01 to 0.5 parts by weight, more preferably 0.02 to 0.1 parts by weight. Within this range, emulsion polymerization may be easily performed, and the residual amount of the initiator in the first graft copolymer may be minimized, as a specific example, the first graft copolymer may have a residual amount of the initiator of several tens of ppm.

For example, the emulsifier may include one or more selected from a potassium compound of alkylbenzene sulfonate, a sodium compound of alkylbenzene sulfonate, a potassium compound of alkyl carboxylate, a sodium compound of alkyl carboxylate, a potassium compound of oleic acid, a sodium compound of oleic acid, a potassium compound of alkyl sulfate, a sodium compound of alkyl sulfate, a potassium compound of alkyl dicarboxylate, a sodium compound of alkyl dicarboxylate, a potassium compound of alkyl ether sulfonate, a sodium compound of alkyl ether sulfonate, and an ammonium compound of allyloxynonylphenoxypropane-2-yloxy methylsulfonate, preferably sodium dodecylbenzenesulfonate.

A commercially available emulsifier may be used as the emulsifier. For example, one or more selected from SE10N, BC-10, BC-20, HS10, Hitenol KH10, and PD-104 may be used as the emulsifier.

For example, based on 100 parts by weight in total of rubber and monomers constituting the first graft copolymer, the emulsifier may be included in an amount of 0.15 to 2.0 parts by weight, preferably 0.3 to 1.5 parts by weight, more preferably 0.5 to 1.2 parts by weight. Within this range, emulsion polymerization may be easily performed, and the residual amount of the initiator in the first graft copolymer may be minimized, as a specific example, the first graft copolymer may have a residual amount of the initiator of several tens of ppm.

When emulsion polymerization is performed, a molecular weight regulator may be further added. For example, the molecular weight regulator may include one or more selected from t-dodecyl mercaptan, N-dodecyl mercaptan, and alpha methyl styrene dimer, preferably t-dodecyl mercaptan.

For example, based on 100 parts by weight in total of rubber and monomers constituting the first graft copolymer, the molecular weight regulator may be included in an amount of 0.1 to 1 part by weight, preferably 0.2 to 0.8 parts by weight, more preferably 0.4 to 0.6 parts by weight.

The emulsion polymerization may be initiated after monomers and the like are fed into a reactor batchwise. Alternatively, a part of monomers and the like may be fed into a reactor before start of emulsion polymerization, and the remainder may be continuously fed after start of emulsion polymerization, or emulsion polymerization may be performed while monomers and the like are continuously fed for a predetermined time.

The first graft copolymer obtained in this way is formed in a latex form. Through coagulation, dehydration, and drying processes, the first graft copolymer may be obtained in a powder form.

As a coagulant used for the coagulation, a salt such as calcium chloride, magnesium sulfate, and aluminum sulfate, an acidic substance such as sulfuric acid, nitric acid, and hydrochloric acid, or a mixture thereof may be used.

For example, based on a total weight of the first graft copolymer, the aromatic vinyl-based monomer included in the first graft copolymer may be included in an amount of 10 to 50% by weight, preferably 20 to 45% by weight. Within this range, mechanical properties, such as tensile strength and impact strength, and processability may be excellent.

For example, the aromatic vinyl-based monomer may include one or more selected from the group consisting of styrene, α-methyl styrene, o-methyl styrene, ρ-methyl styrene, m-methyl styrene, ethyl styrene, isobutyl styrene, t-butyl styrene, o-bromo styrene, ρ-chloro styrene, m-bromo styrene, o-chlorostyrene, ρ-chloro styrene, m-chlorostyrene, vinyltoluene, vinylxylene, fluorostyrene, and vinylnaphthalene. In this case, processability may be excellent due to proper fluidity, and mechanical properties such as tensile strength and impact strength may be excellent.

For example, based on a total weight of the first graft copolymer, the vinyl cyanide-based monomer included in the first graft copolymer may be included in an amount of 5 to 30% by weight, preferably 5 to 25% by weight, more preferably 10 to 20% by weight. Within this range, impact resistance and processability may be excellent.

For example, the vinyl cyanide-based monomer may be acrylonitrile, methacrylonitrile, or a mixture thereof. In this case, impact resistance and processability may be excellent.

Based on a total weight of the thermoplastic resin composition, the first graft copolymer may be included in an amount of 10 to 30% by weight, preferably 15 to 25% by weight, more preferably 20 to 25% by weight. Within this range, in addition to mechanical properties such impact strength and tensile strength, heat resistance, weather resistance, scratch resistance, and colorability may be excellent. When the first graft copolymer is included in an amount less than the above range, impact resistance may be deteriorated. When the first graft copolymer is included in an amount exceeding the above range, fluidity and scratch resistance may be deteriorated.

Second Graft Copolymer

The second graft copolymer may be prepared by graft-polymerizing acrylic-based rubber having an average particle diameter different from that of the acrylic-based rubber of the first graft copolymer, an aromatic vinyl monomer, and a vinyl cyanide-based monomer. For example, the second graft copolymer may be a graft copolymer including an acrylic-based rubber polymer having an average particle diameter of 300 to 600 nm. In this case, in addition to mechanical properties such impact strength and tensile strength, heat resistance, colorability, and weather resistance may be excellent.

For example, the acrylic-based rubber included in the second graft copolymer may have an average particle diameter of 300 to 600 nm, preferably 300 to 500 nm, more preferably 350 to 450 nm. Within this range, mechanical properties such as impact strength and tensile strength may be excellent. When the acrylic-based rubber has an average particle diameter less than the range, impact resistance may be deteriorated. When the acrylic-based rubber has an average particle diameter exceeding the range, fluidity and processability may be deteriorated.

For example, based on a total weight of the second graft copolymer, the acrylic-based rubber included in the second graft copolymer may be included in an amount of 20 to 60% by weight, preferably 30 to 55% by weight, more preferably 40 to 50% by weight. Within this range, weather resistance, impact strength, and scratch resistance may be excellent.

For example, the acrylic-based rubber may be prepared by emulsion-polymerizing a (meth)acrylate-based monomer. As a specific example, the acrylic-based rubber may be prepared by mixing a (meth)acrylate-based monomer, an emulsifier, an initiator, a grafting agent, a crosslinking agent, an electrolyte, and water and emulsion-polymerizing the mixture. In this case, grafting degree may be improved, and thus physical properties such as impact resistance may be excellent.

The (meth)acrylate-based monomer, the emulsifier, the initiator, the grafting agent, and the like used to prepare the acrylic-based rubber may be the same as those used to prepare the acrylic-based rubber included in the first graft copolymer described above, and the contents thereof may be determined within the same content range as in the first graft copolymer.

The aromatic vinyl-based monomer and the vinyl cyanide-based monomer may be the same as those included in the first graft copolymer described above.

For example, based on a total weight of the second graft copolymer, the aromatic vinyl-based monomer included in the second graft copolymer may be included in an amount of 10 to 50% by weight, preferably 20 to 45% by weight. Within this range, impact resistance, weather resistance, and chemical resistance may be excellent.

For example, based on a total weight of the second graft copolymer, the vinyl cyanide-based monomer included in the second graft copolymer may be included in an amount of 5 to 30% by weight, preferably 5 to 25% by weight, more preferably 10 to 20% by weight. Within this range, impact resistance and processability may be excellent.

In this description, the term "total weight of a copolymer" may mean the actual total weight of the obtained copolymer or may mean the total weight of rubber and/or monomers added instead of the copolymer.

Based on a total weight of the thermoplastic resin composition, the second graft copolymer may be included in an amount of 1 to 15% by weight, preferably 1 to 10% by weight, more preferably 3 to 7% by weight. Within this range, in addition to mechanical properties such impact strength and tensile strength, heat resistance, weather resistance, scratch resistance, and colorability may be excellent.

When the second graft copolymer is included in an amount less than the range, impact resistance may be deteriorated. When the second graft copolymer is included in an amount exceeding the range, grafting degree may be reduced, resulting in deterioration in hardness and scratch resistance.

Thermoplastic Resin Composition

For example, the thermoplastic resin composition may include one or more selected from the group consisting of a lubricant, an antioxidant, a UV stabilizer, a release agent, a pigment, and a dye. In this case, weather resistance, heat resistance, processability, and scratch resistance may be excellent without deterioration in mechanical properties.

For example, the lubricant may include one or more selected from the group consisting of ethylenebis stearamide, oxidized polyethylene wax, and magnesium stearate, preferably ethylene bis stearamide. When the lubricant is ethylene bis stearamide, the wettability of the composition of the present invention may be improved, and the mechanical properties thereof may be excellent.

For example, based on 100 parts by weight in total of the styrene-based copolymer, the first graft copolymer, and the second graft copolymer, the lubricant may be included in an amount of 0.1 to 3 parts by weight, preferably 0.1 to 2 parts by weight, more preferably 0.05 to 1.5 parts by weight. Within this range, the wettability of the composition of the present invention may be improved, and the mechanical properties thereof may be excellent.

For example, the antioxidant may include phenolic antioxidants, phosphorus antioxidants, or mixtures thereof. In this case, oxidation by heat may be prevented during an extrusion process, and the mechanical properties of the composition of the present invention may be excellent.

For example, based on 100 parts by weight in total of the styrene-based copolymer, the first graft copolymer, and the second graft copolymer, the antioxidant may be included in an amount of 0.01 to 3 parts by weight, preferably 0.01 to 1 part by weight, more preferably 0.1 to 1 part by weight. Within this range, oxidation by heat may be prevented during an extrusion process, and the mechanical properties of the composition of the present invention may be excellent.

For example, based on 100 parts by weight in total of the styrene-based copolymer, the first graft copolymer, and the second graft copolymer, the dye may be included in an amount of 0.1 to 1.5 parts by weight, preferably 0.5 to 1 part by weight. Within this range, color expression may be excellent without deterioration in the intrinsic physical properties of the composition of the present invention.

For example, the thermoplastic resin composition may have a weather resistance (ΔE) of 1.8 or less, preferably 1.0 to 1.8, more preferably 1.5 to 1.8. Within this range, physical property balance may be excellent.

In this description, weather resistance (ΔE) may be measured using a weather resistance tester (QW) under measurement conditions of UV LAMP Illuminance: 0.77 $W/m^2$, humidity: 50%, BLACK PANEL temperature: 60° C., and residence time: 20 hours. ΔE is the arithmetic mean value of Hunter Lab values before and after residence calculated by Equation 2 below. Weather resistance increases as the value of ΔE approaches zero.

$$\Delta E=\sqrt{\{(L-L')^2+(a-a')^2+(b-b')^2\}} \text{ (√: square root sign)} \quad \text{[Equation 2]}$$

For example, the thermoplastic resin composition may have an L value (colorability) of 24.8 or less, preferably 20 to 24.8, more preferably 23 to 24.8 as measured using a Hunter Lab. Within this range, physical property balance may be excellent.

For example, the thermoplastic resin composition may have a fluidity of 11 to 16 g/10 min, preferably 12 to 16 g/10 min as measured at 220° C. under a load of 10 kg according to ASTM D1238. Within this range, processability may be excellent.

For example, the thermoplastic resin composition may have a pencil hardness of 2H or more, preferably 2H to 4H as measured at 45° under a load of 0.5 kg using a pencil hardness tester (Cometech) according to ASTM D3363. Within this range, physical property balance and scratch resistance may be excellent.

For example, the thermoplastic resin composition may have a heat deflection temperature of 89° C. or higher, preferably 89 to 100° C., more preferably 89 to 96° C. as measured according to ASTM D648. Within this range, physical property balance may be excellent.

For example, the thermoplastic resin composition may have an Izod impact strength (¼", 23° C.) of 5 kgf·cm/cm or more, preferably 5 to 10 kgf·cm/cm, more preferably 5 to 8 kgf·cm/cm as measured according to ASTM D256. Within this range, the balance of all physical properties may be excellent.

<Method of Preparing Thermoplastic Resin Composition>

In description of a method of preparing the thermoplastic resin composition of the present invention, all of the contents of the above-described thermoplastic resin composition are included.

For example, the method of preparing the thermoplastic resin composition is as follows.

For example, the method of preparing the thermoplastic resin composition may include a step of preparing a styrene-based copolymer by suspension-polymerizing a polymerization solution prepared by mixing 100 parts by weight of a monomer mixture including a (meth)acrylate-based monomer, an aromatic vinyl-based monomer, and a maleimide-based monomer, 100 to 200 parts by weight of a reaction solvent, 0.01 to 1 part by weight of an initiator, 1 to 5 parts by weight of a dispersant, and 0.01 to 1 part by weight of a molecular weight regulator.

In the step of preparing a styrene-based copolymer, a reaction solvent may be water. In this case, reaction heat may be easily controlled, and polymerization may be performed even at high viscosity, which increases polymerization conversion rate.

For example, based on 100 parts by weight of the monomer mixture, the reaction solvent may be included in an amount of 100 to 200 parts by weight, preferably 110 to 150 parts by weight. Within this range, monomers may be easily mixed, and polymerization stability may be improved, so that a uniform composition and high polymerization conversion may be obtained.

In the step of preparing a styrene-based copolymer, for example, the initiator is a peroxide, and preferably includes one or more selected from the group consisting of t-butylperoxy-2-ethylhexanoate, benzoyl peroxide, t-butyl peroxyisobutyrate, 1,1-bis(t-butylperoxy)cyclohexane, 2,2-bis(4,4-di-t-butylperoxycyclohexane)propane, t-hexylperoxyisopropyl monocarbonate, t-butyl peroxylaurate, t-butylperoxy isopropyl monocarbonate, t-butylperoxy 2-ethylhexyl monocarbonate, t-hexyl peroxybenzoate, t-butyl peroxyacetate, 2,2-bis(t-butylperoxy)butane, t-butyl peroxybenzoate, dicumyl peroxide, 2,5-dimethyl-2,5-bis(t-butylperoxy)hexane, t-butylcumyl peroxide, di-t-butyl peroxide, and di-t-amine peroxide.

In this case, polymerization may be easily performed, and thus mechanical properties, weather resistance, heat resistance, and scratch resistance may excellent.

For example, based on 100 parts by weight of the monomer mixture, the initiator may be included in an amount of 0.01 to 1 part by weight, preferably 0.01 to 0.5 parts by weight, more preferably 0.01 to 0.2 parts by weight. Within this range, polymerization may be easily performed, and thus mechanical properties, weather resistance, heat resistance, and scratch resistance may excellent.

In the step of preparing a styrene-based copolymer, for example, the dispersant may be a phosphate salt, preferably a metal phosphate salt, more preferably tricalcium phosphate. In this case, polymerization stability may be improved, and thus a copolymer having a high polymerization conversion rate may be prepared.

For example, based on 100 parts by weight of the monomer mixture, the dispersant may be included in an amount of 1 to 5 parts by weight, preferably 1 to 3 parts by weight. Within this range, polymerization may be easily performed, and uniform particles may be prepared, allowing easy processing.

In the step of preparing a styrene-based copolymer, for example, suspension polymerization may be performed by stirring the polymerization solution at 80 to 130° C. and a stirring rate of 400 to 600 rpm for 3 to 10 hours. In this case, the polymerization conversion rate of a copolymer may be improved, and the contents of residual monomers and residual oligomers in particles may be reduced, thereby improving mechanical properties, weather resistance, heat resistance, scratch resistance, and colorability.

As a specific example, in terms of the conversion rate, colorability, and residual oligomer content of the styrene-based copolymer, most preferably, polymerization is performed at 80 to 100° C. for 3 to 6 hours, and then polymerization is performed at 100 to 130° C. for 1 to 3 hours. When polymerization time exceeds the range and polymerization is performed for a long time, conversion rate is insignificantly affected, and colorability and residual oligomer content may be increased. When polymerization time is less than the range and polymerization is performed for a short time, conversion rate may be reduced, and colorability and residual oligomer content may be increased.

Then, the pH of a polymerization slurry formed by the suspension polymerization may be adjusted to 1 to 4 to prepare a styrene-based copolymer in a bead form. When the above-described pH range is satisfied, the dispersant contained in the reactant may be effectively removed, and a product of high purity may be manufactured.

In this description, methods commonly used in the art may be used to measure pH. For example, pH may be measured using a pH meter.

In this case, the pH of the polymerization slurry may be adjusted using an acid solution, for example, formic acid or hydrochloric acid.

For example, the kneading and extrusion may be performed using a single-screw extruder, a twin-screw extruder, or a Banbury mixer. In this case, a composition may be uniformly dispersed, and thus compatibility may be excellent.

For example, the kneading and extrusion may be performed at a barrel temperature of 200 to 270° C., preferably 220 to 270° C. In this case, throughput per unit time may be appropriate, and melt-kneading may be sufficiently performed. In addition, thermal decomposition of a resin component may be prevented.

For example, the kneading and extrusion may be performed at a screw rotation rate of 200 to 300 rpm, preferably 250 to 300 rpm. In this case, since throughput per unit time is appropriate, process efficiency may be excellent, and excessive cutting may be prevented.

For example, the molded article of the present invention may be manufactured using the thermoplastic resin composition of the present invention. In this case, weather resistance, colorability, processability, and scratch resistance may be improved while maintaining heat resistance.

For example, the molded article may include one or more selected from the group consisting of automobile parts, electrical and electronic parts, and building materials.

In describing the thermoplastic resin composition of the present invention, the method of preparing the same, and the molded article including the same, other conditions or equipment not explicitly described can be appropriately selected within the range commonly practiced in the art, without particular limitation.

Hereinafter, exemplary embodiments of the present invention will be described in detail so as for those of ordinary skill in the art to easily implement the present invention. The present invention may be implemented in various different forms and is not limited to these embodiments.

EXAMPLES

Materials used in Examples and Comparative Examples below are as follows.

(B) First graft copolymer: Graft copolymer (SA130, LG Chemical Co.) having a rubber average particle diameter of 120 nm (C) Second graft copolymer: Graft copolymer (SA927, LG Chemical Co.) having a rubber average particle diameter of 400 nm Lubricant: Ethylene bis stearamide (EBA)

Antioxidant: Songnox 11B (Songwon Industries Co.)

Dye: BK-39 (LG Chemical Co.)

Example 1

<(A) Preparation of Styrene-Based Copolymer>

140 parts by weight of deionized water, 86 parts by weight of methylmethacrylate (hereinafter referred to as "MMA"), 4 parts by weight of N-phenylmaleimide (hereinafter referred to as "PMI"), 10 parts by weight of styrene (hereinafter referred to as "SM"), 0.06 parts by weight of t-butylperoxybenzoate as an initiator, 1.3 parts by weight of tricalcium phosphate as a dispersant, and 0.2 parts by weight of t-dodecyl mercaptan as a molecular weight regulator were introduced into a reactor, and then polymerization was initiated by raising temperature to 100° C. at 500 rpm. The polymerization reaction was maintained for 6 hours. Thereafter, the polymerization reaction was completed.

Formic acid was added to the prepared polymerization slurry to adjust the pH thereof to 2.5 to remove the dispersant, and then washing, dehydration, and drying were performed to prepare a styrene-based copolymer in a bead form. The prepared copolymer had a refractive index of 1.499, a glass transition temperature of 121.8° C., and a weight average molecular weight of 113,000 g/mol.

<Preparation of Thermoplastic Resin Composition>

1 part by weight of a lubricant, 0.5 parts by weight of an antioxidant, and 0.5 parts by weight of a dye were added to 100 parts by weight of a copolymer composition consisting of 75 parts by weight of the prepared styrene-based copolymer (A), 20 parts by weight of the first graft copolymer (B), and 5 parts by weight of the second graft copolymer (C), and the mixture was introduced into an extruder (28Φ) at 240° C. to prepare a resin in a pellet form. Then, the resin was injected to obtain a specimen.

Examples 2 to 6

Specimens were prepared in the same manner as in Example 1, except that the components and the contents shown in Table 1 below were used when preparing the styrene-based copolymer (A).

Comparative Examples 1 to 6

Specimens were prepared in the same manner as in Example 1, except that the components and the contents shown in Table 2 below were used when preparing the styrene-based copolymer (A). For reference, in Comparative Example 6, α-methyl styrene (hereinafter referred to as "AMS") was added instead of SM.

Comparative Example 7

A specimen was prepared in the same manner as in Example 1, except that the process of preparing the styrene-based copolymer (A) described above was replaced with a process described below.

Specifically, a polymerization solution prepared by adding 0.03 parts by weight of dicumyl peroxide to 100 parts by weight of a monomer solution consisting of 25% by weight of toluene, 67.5% by weight of methylmethacrylate, 2.25% by weight of N-phenylmaleimide, and 5.25% by weight of styrene was fed into a 145° C. continuous reactor at a rate of 12 kg/hr to perform polymerization. Then, the resultant was immersed in a volatile tank at 250° C. to remove unreacted monomers and the reaction solvent to prepare a heat-resistant copolymer in a pellet form.

Comparative Example 8

A polymer in a pellet form was prepared in the same manner as in Example 1, except that the styrene-based copolymer (A) of Example 1 was replaced with a styrene-based copolymer (A-1) including 60 parts by weight of methylmethacrylate (hereinafter referred to as "MMA"), 7 parts by weight of acrylonitrile (hereinafter referred to as "AN"), and 33 parts by weight of styrene, and the first graft copolymer (B) and the second graft copolymer (C) were added according to the content ranges shown in Table 2 below.

Test Examples

The physical properties of the specimens prepared in Examples 1 to 6 and Comparative Examples 1 to 8 were measured according to the following methods, and the results are shown in Tables 1 and 2 below.

Physical Properties Measurement

Refractive index: Refractive index was measured at 25° C. using an Abbe refractometer according to ASTM D542.

Weight average molecular weight (g/mol): Weight average molecular weight was measured at 40° C. using tetrahydrofuran (THF) as an eluate using a gel permeation chromatograph (GPC) filled with porous silica as a column packing material. In this case, weight average molecular weight was obtained as a relative value to a polystyrene standard (PS) specimen.

Glass transition temperature (° C.): Glass transition temperature was measured using a differential scanning calorimeter (product name: DISCOVERY DSC25, manufacturer: Ta Instruments).

Conversion rate (% by weight): A portion of a polymer in a reactor was removed, the moisture content thereof was measured, and the actual weight of the sample was obtained using Equation 3 below. Then, the sample was dissolved with THF/MeOH and precipitated, and float was dried and the weight thereof was measured. The measured values were substituted into Equation 4 below to calculate conversion rate.

Actual weight of sample=(Collected reactant)−(Collected reactant×moisture content/100) [Equation 3]

Polymerization conversion rate (%)=(Sample after drying)/(Sample before drying)×100 [Equation 4]

Residual oligomer content (% by weight): 1 g of a sample was dissolved in 10 mL of chloroform, and polymers were precipitated using methanol to obtain the supernatant of the sample. Then, the supernatant was filtered using a 0.2 μm disc syringe filter, and residual oligomer content was measured using ALS-GC/FID.

Izod impact strength (kgf·cm/cm): Izod impact strength was measured using a ¼" thick specimen according to ASTM D256.

Fluidity (g/10 min): Fluidity was measured at 220° C. under a load of 10 kg for 10 minutes according to ASTM D1238.

Heat deflection temperature (° C.): Heat deflection temperature was measured using a 6.4 mm thick specimen under a load of 18.6 kgf/cm$^2$ according to ASTM D648.

Pencil hardness: Pencil hardness was measured using a pencil hardness tester (Cometech) according to ASTM D3363. Specifically, a pencil was fixed at an angle of 45°, and the surface of a specimen was scratched with the pencil under a load of 0.5 kg. At this time, pencils of various hardness (2B, B, HB, F, H) were used. The tests were conducted in the order of 2B, B, HB, F, and H. After scratching, whether the surface was scratched was confirmed by visual observation.

Colorability (blackness: Color L): A color L value was measured using a color meter (model name: Color Eye 7000A) according to a CIE 1976 L*a*b* color system. In this case, L=100 means pure white, and L=0 means pure black. Blackness becomes better as the L value decreases.

Weather resistance (ΔE): Weather resistance (ΔE) was measured using a weather resistance tester (QW) under measurement conditions of UV LAMP Illuminance: 0.77 W/m$^2$, humidity: 50%, BLACK PANEL temperature: 60° C., and residence time: 20 hours. ΔE is the arithmetic mean value of Hunter Lab values before and after residence calculated by Equation 2 below. Weather resistance increases as the value of ΔE approaches zero.

$\Delta E=\sqrt{\{(L-L')^2+(a-a')^2+(b-b')^2\}}$ (√: square root sign) [Equation 2]

TABLE 1

| Classification | | Ex1 | Ex2 | Ex3 | Ex4 | Ex5 | Ex6 |
|---|---|---|---|---|---|---|---|
| A composition (MMA) | | 86 | 82 | 78 | 74 | 69 | 64 |
| A composition (PMI) | | 4 | 2 | 6 | 8 | 8 | 10 |
| A composition (SM) | | 10 | 16 | 16 | 18 | 23 | 26 |
| A physical properties (refractive index) | | 1.499 | 1.504 | 1.509 | 1.515 | 1.517 | 1.518 |
| A physical properties (Mw) | | 113,000 | 96,000 | 103,000 | 122,000 | 115,000 | 133,000 |
| A physical properties (Tg) | | 121.8 | 120.1 | 122.8 | 124 | 123.1 | 124.3 |
| A physical properties (conversion rate) | | 97 | 96 | 96 | 97 | 96 | 96 |
| A physical properties (residual oligomers) | | 0.33 | 0.36 | 0.33 | 0.32 | 0.34 | 0.35 |
| Composition of thermoplastic resin composition | (A) | 75 | 75 | 75 | 75 | 75 | 75 |
| | (B) | 20 | 20 | 20 | 20 | 20 | 20 |
| | (C) | 5 | 5 | 5 | 5 | 5 | 5 |
| Physical properties of thermoplastic resin composition | Impact strength | 6 | 5 | 5 | 6 | 6 | 7 |
| | Fluidity | 15 | 16 | 15 | 14 | 15 | 13 |
| | Heat deflection temperature | 93 | 91 | 94 | 95 | 95 | 96 |
| | Pencil hardness | 2H | 2H | 2H | 2H | 2H | 2H |
| | Colorability (L) | 24.1 | 24.2 | 24.4 | 24.6 | 24.7 | 24.8 |
| | Weather resistance | 1.5 | 1.6 | 1.7 | 1. 7 | 1.7 | 1.8 |

(In Table 1, A indicates the styrene-based copolymer)

TABLE 2

| Classification | | Com Ex1 | Com Ex2 | Com Ex3 | Com Ex4 | Com Ex5 | Com Ex6 | Com Ex7 | Com Ex8 |
|---|---|---|---|---|---|---|---|---|---|
| A composition (MMA) | | 94 | 80 | 75 | 70 | 60 | 74 | 90 | 60 |
| A composition (PMI) | | 4 | 3 | 5 | 3 | 10 | 8 | 3 | — |
| A composition (SM) | | 1 | 17 | 20 | 27 | 30 | — | 7 | 33 |
| A composition (AN) | | — | — | — | — | — | — | — | 7 |
| A composition (AMS) | | — | — | — | — | — | 18 | — | — |
| A physical properties (refractive index) | | 1.499 | 1.517 | 1.521 | 1.525 | 1.531 | 1.521 | 1.5 | 1.53 |
| A physical properties (Mw) | | 73,000 | 96,000 | 140,000 | 149,000 | 142,000 | 112,000 | 84,000 | 80,000 |
| A physical properties (Tg) | | 120.1 | 118.7 | 117.7 | 111.8 | 115.3 | 124.5 | 120.5 | 102.3 |
| A physical properties (conversion rate) | | 96 | 97 | 96 | 96 | 96 | 93 | 70 | 96 |
| A physical properties (residual oligomers) | | 0.38 | 0.40 | 0.41 | 0.46 | 0.42 | 0.61 | 0.48 | 0.39 |
| Composition of thermoplastic resin composition | (A) | 75 | 75 | 75 | 75 | 75 | 75 | 75 | 65 |
| | (B) | 20 | 20 | 20 | 20 | 20 | 20 | 20 | 30 |
| | (C) | 5 | 5 | 5 | 5 | 5 | 5 | 5 | 5 |
| Physical properties of thermoplastic resin composition | Impact strength | 3 | 6 | 9 | 10 | 10 | 5 | 6 | 5 |
| | Fluidity | 16 | 14 | 10 | 9 | 10 | 15 | 14 | 19 |
| | Heat deflection temperature | 93 | 90 | 87 | 83 | 87 | 91 | 96 | 83.5 |
| | Pencil hardness | H | H | H | F | F | 2H | 2H | 2H |
| | Colorability (L) | 24 | 24.7 | 25 | 25.3 | 25.5 | 25.3 | 23.8 | 26 |
| | Weather resistance | 1.5 | 1.7 | 1.8 | 1.9 | 1.9 | 1.5 | 1.8 | 1.4 |

(In Table 2, A indicates the styrene-based copolymer)

As shown in Tables 1 and 2, compared to Comparative Examples 1 to 8 outside the range of the present invention, in the case of Examples 1 to 6 according to the present invention, in addition to impact strength, heat resistance, and weather resistance, fluidity, heat deflection temperature, pencil hardness (scratch resistance), and colorability are excellent.

In addition, as shown in Table 1, the styrene-based copolymers (A) prepared in Examples 1 to 6 according to the present invention have a low refractive index and a high glass transition temperature, indicating that the colorability and heat deflection temperature of a resin composition are improved.

On the other hand, as shown in Table 2, in the case of Comparative Examples 1 to 8, in all cases, residual oligomer contents are 0.38% by weight or more.

In addition, in the case of Comparative Examples 2 and 3 not satisfying the weight ratio of SM/MMA of 1:2.46 to 1:3.5 or 1:4.8 to 1:8.6 in the styrene-based copolymer (A), pencil hardness (scratch resistance) is poor. In particular, in the case of Comparative Example 3 having a lower MMA content than Comparative Example 2, all of fluidity, heat deflection temperature, and colorability are poor.

In addition, in the case of Comparative Example 5 having a weight ratio of SM/MMA of less than 1:2.46 and Comparative Example 1 having a weight ratio of SM/MMA of exceeding 1:8.6, the weight average molecular weight of the styrene-based copolymer is poor, thereby deteriorating pencil hardness (scratch resistance).

In addition, in the case of Comparative Example 4 having significantly less PMI content compared to SM, Tg and heat deflection temperature are low, and pencil hardness (scratch resistance) is poor.

In addition, in the case of Comparative Example 6 using an alkyl-substituted aromatic vinyl-based compound instead of styrene, polymerization conversion rate is reduced, residual oligomer content is increased, and colorability is deteriorated due to increase in refractive index.

In addition, in the case of Comparative Example 7 using bulk polymerization, the weight average molecular weight of the styrene-based copolymer is poor, thereby reducing pencil hardness (scratch resistance) or increasing residual oligomer content.

In addition, in the case of Comparative Example 8 using a transparent styrene-based copolymer not including a heat resistance monomer, although the content of transparent residual oligomers is within an appropriate range, heat resistance is greatly reduced, and pencil hardness (scratch resistance) and colorability are significantly deteriorated.

In conclusion, when graft copolymers each containing rubber particles having different particle diameters and a styrene-based copolymer having a specific refractive index, molecular weight, glass transition temperature, and residual oligomer content are included, a thermoplastic resin composition suitable for a molded article having excellent colorability, processability, and scratch resistance while having excellent weather resistance and heat resistance may be provided.

The invention claimed is:

1. A method of preparing a thermoplastic resin composition, comprising:

suspension-polymerizing a polymerization solution prepared by mixing 100 parts by weight of a monomer mixture comprising a (meth)acrylate-based monomer, an aromatic vinyl-based monomer, and a maleimide-based monomer, 100 to 200 parts by weight of a reaction solvent, 0.01 to 1 part by weight of an initiator, 1 to 5 parts by weight of a dispersant, and 0.01 to 1 part by weight of a molecular weight regulator to form a polymerization slurry;

adjusting a pH of the polymerization slurry to 1 to 4 and preparing a styrene-based copolymer; and mixing 65 to 85% by weight of the styrene-based copolymer, 10 to 30% by weight of a first graft copolymer comprising a first acrylic-based rubber polymer, and 1 to 15% by weight of a second graft copolymer comprising a second acrylic-based rubber polymer and performing kneading and extrusion at 200 to 270° C., wherein the styrene-based copolymer has a residual oligomer content of 0.37% by weight or less, and the first acrylic-based rubber polymer and the second acrylic-based rubber polymer of the second graft copolymer have different average particle diameters.

2. The method according to claim 1, wherein the reaction solvent is water, the initiator is a peroxide, and the dispersant is a phosphate salt.

3. The method according to claim 1, wherein the suspension polymerization is performed at 80 to 130° C. and 400 to 600 rpm.

4. The method according to claim 1, wherein the pH of the polymerization slurry is adjusted using an acid solution.

5. The method according to claim 1, wherein the aromatic vinyl monomer includes one or more selected from the group consisting of styrene, α-methyl styrene, α-ethyl styrene, and ρ-methyl styrene.

* * * * *